United States Patent
Kartashov et al.

(10) Patent No.: US 12,066,619 B2
(45) Date of Patent: Aug. 20, 2024

(54) OPTICAL DEVICE WITH A LIGHT RAY DEFLECTOR

(71) Applicant: poLight ASA, Skoppum (NO)

(72) Inventors: Vladimir Kartashov, Horten (NO); Pierre Craen, Embourg (BE); Nicolas Tallaron, Neuville sur Saône (FR)

(73) Assignee: poLight ASA, Skoppum (NO)

( * ) Notice: Subject to any disclaimer, the term of this patent is extended or adjusted under 35 U.S.C. 154(b) by 503 days.

(21) Appl. No.: 17/283,230

(22) PCT Filed: Oct. 11, 2019

(86) PCT No.: PCT/EP2019/077608
§ 371 (c)(1),
(2) Date: Apr. 6, 2021

(87) PCT Pub. No.: WO2020/074711
PCT Pub. Date: Apr. 16, 2020

(65) Prior Publication Data
US 2021/0341728 A1 Nov. 4, 2021

(30) Foreign Application Priority Data

Oct. 12, 2018 (EP) ..................... 18200220
Dec. 21, 2018 (EP) ..................... 18215168

(51) Int. Cl.
*G02B 26/08* (2006.01)
*G02B 5/04* (2006.01)
*G02B 27/64* (2006.01)

(52) U.S. Cl.
CPC .......... *G02B 26/0825* (2013.01); *G02B 5/04* (2013.01); *G02B 27/646* (2013.01)

(58) Field of Classification Search
CPC .... G02B 26/0825; G02B 5/04; G02B 27/646; G02B 3/14
See application file for complete search history.

(56) References Cited

U.S. PATENT DOCUMENTS 3,565,514 A * 2/1971 Bate ..................... G02B 26/001
359/857
5,623,305 A 4/1997 Ishizuka et al.
(Continued)

FOREIGN PATENT DOCUMENTS

EP 2682814 A1 1/2014
JP 60-225031 A 11/1985
(Continued)

OTHER PUBLICATIONS

International Search Report for PCT/EP2019/077608 dated Jan. 14, 2020.
(Continued)

*Primary Examiner* — Euncha P Cherry
(74) *Attorney, Agent, or Firm* — Knobbe, Martens, Olson & Bear, LLP

(57) ABSTRACT

The invention relates to an optical assembly for use with compact camera modules. The optical assembly comprises a transparent optical element, an optical reflection surface arranged to deflect a light through the optical element, a transparent elastic non-fluid body and an actuator system comprising one or more actuators and an actuator-component arranged to undergo bending and/or displacement by the one or more actuators. The non-fluid body may be sandwiched between the actuator-component and the optical element so that the shape or orientation of the actuator component and the non-fluid body can be changed by actuation of the actuators to provide adjustable optical power or beam deflection.

23 Claims, 5 Drawing Sheets

(56) References Cited

U.S. PATENT DOCUMENTS

| | | | |
|---|---|---|---|
| 8,199,410 B2 * | 6/2012 | Haugholt | G02B 3/14 359/666 |
| 2008/0285144 A1 | 11/2008 | Oshima et al. | |
| 2011/0149409 A1 | 6/2011 | Haugholt et al. | |

FOREIGN PATENT DOCUMENTS

| | | |
|---|---|---|
| JP | 2010-504554 A | 2/2010 |
| JP | 2012-103626 A | 5/2012 |
| WO | WO 2008/096580 A1 | 8/2008 |
| WO | WO 2009/033350 A1 | 3/2009 |
| WO | WO 2015/024136 A1 | 2/2015 |
| WO | WO 2015/134174 A1 | 9/2015 |
| WO | WO 2015/153200 A1 | 10/2015 |

OTHER PUBLICATIONS

Office Action in JP 2021-516489.
Office Action for CN 201980067317.8 issued May 6, 2022.

\* cited by examiner

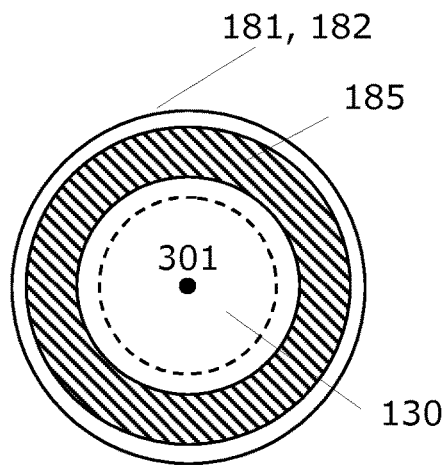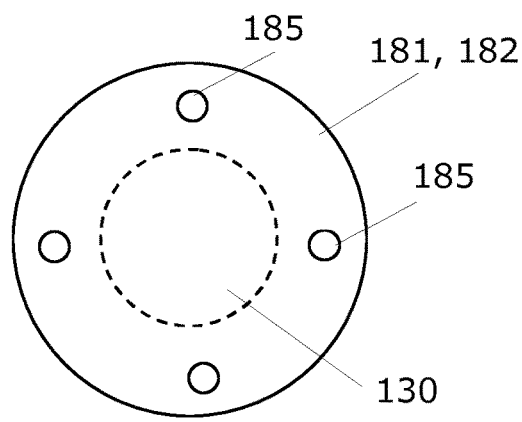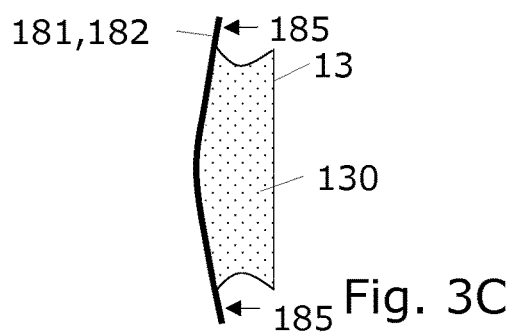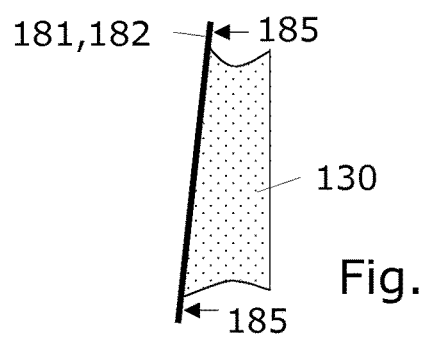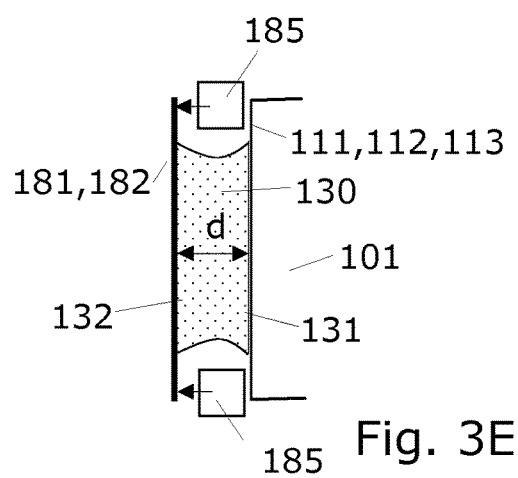

OPTICAL DEVICE WITH A LIGHT RAY DEFLECTOR

CROSS REFERENCE TO RELATED APPLICATIONS

This application is a U.S. National Phase Application of PCT International Application Number PCT/EP2019/077608, filed on Oct. 11, 2019, designating the U.S. of America and published in the English language, which is an International Application of and claims the benefit of priority to European Patent Application No. 18200220.4, filed on Oct. 12, 2018, and European Patent Application No. 18215168.8, filed on Dec. 21, 2018. The disclosures of the above-referenced applications are hereby expressly incorporated by reference in their entireties.

FIELD OF THE INVENTION

The present invention relates to optical systems, particularly optical imagining systems for devices such as compact cameras and smart phones.

BACKGROUND OF THE INVENTION

Autofocus and image stabilization are common features in most compact cameras, and there is an ongoing focus on making systems performing such tasks smaller, cheaper, and more robust while simultaneously increasing the optical quality.

Integration of autofocus or image stabilization, or both, in optical assemblies, requires inclusion of components which may improve imaging properties, but at the cost of the size of the assembly.

In order to still allow improvement of imaging properties and/or limiting increases of the size or even achieve reductions of the size or certain dimensions of the optical assembly there is a need for improved designs of the assembly. There is also a need also to improve robustness of the optical assembly.

SUMMARY OF THE INVENTION

It is an object of the invention to improve optical assemblies for use in optical imaging systems, particularly imaging systems for compact cameras. The improvements may relate to one or more of imaging quality, imaging stabilization, size reductions, and other optical properties.

In a first aspect of the invention there is provided an optical assembly comprising,
  a transparent optical element with at least first and second sides,
  an optical reflection surface arranged to deflect a light ray transmitted through the first side,
  a transparent, deformable, non-fluid body comprising a first surface and an opposite second surface, wherein the optical reflection surface, the first surface of the non-fluid body and the first and second sides of the transparent optical element are connected via one or more interconnected optically transparent components, and wherein the refractive index throughout the connection is greater than the refractive index of air,
  an actuator system comprising one or more actuators and an actuator-component arranged to undergo bending and/or displacement by the one or more actuators, where a side of the actuator-component abuts the second surface of the non-fluid body.

The possibility to bend and/or displace the actuator-component has the effect that the shape, orientation (e.g. tilt) and/or the position of the second surface of the non-fluid body can be changed by actuation of the actuators. I.e. the bending of the actuator component effects the shape of the second surface of the non-fluid body and the displacement of the actuator component affects the orientation and/or the position of the second surface of the non-fluid body. By orientation is meant the angle of the second surface relative to the first surface and by position is meant the distance from a point on the second surface to the first surface in a direction that is perpendicular to the first surface. The actuator-component may be configured so that it covers at least the center portion of the second surface of the non-fluid body, i.e. the portion arranged to transmit light such as the portion comprising the optical axis being normal to the second surface, or so that it covers and circumscribes the second surface of the non-fluid body. Accordingly, the actuator-component serves both the function of affecting the shape, orientation and/or the position of the second surface of the non-fluid body and the function of transmitting and/or reflecting light from/into the non-fluid body.

The refractive index of the transparent optical element, which is solid, is higher than the refractive index of the surrounding air. Accordingly, the optical element reduces divergence of the light beams propagating in the transparent optical element as compared to propagation in air. Advantageously, this confinement of diverging light rays implies that the lateral extension of the bundle of light rays is reduced as compared to propagation in air. Thus, the lateral extension of optical components may similarly be reduced as compared to a situation where the light rays propagate in air instead of the transparent optical component.

Advantageously, by configuring the optical assembly so that the optical reflection surface, at least the first surface of the non-fluid body and the first and/or second sides of the transparent optical element are connected via one or more interconnected optically transparent components having a refractive index which is greater than the refractive index of air, or which have the same or substantially the same refractive index being higher than the refractive index of air or which have the same or substantially the same refractive index as the transparent optical element, implies that the afore-mentioned advantageous confinement of diverging light rays is maintained throughout the interconnected transparent components and between at least the optical reflection surface, the first surface of the non-fluid body and the first and/or second sides of the transparent optical element.

The optical element may be a prism, a plate or block shaped element or other optical element. The optical element can be made from any optically transparent material such a glass, polymer, polycarbonate and other plastic materials. The first and second sides refer to optical transparent sides arranged for transmission of light, e.g. transmission into and out of the optical element, and/or reflection of light, e.g. via a reflective surface. Thus, the at least first and second sides are optical interfaces intended for transmitting and/or reflecting light rays such as light rays that should be imaged onto an image sensor. The optical assembly may be an optical imaging assembly particularly configured for imagining purposes.

Any of the at least first and second sides may have a plane surface or curved surface to provide an optical power.

The optical reflection surface is arranged to deflect the incoming light rays into a direction which is different from the direction of the incoming light rays. For example, the optical reflection surface may be arranged at an angle of 45 degrees relative to the first surface so that an incoming light ray which is perpendicular to the first side is deflected by 90 degrees. The reflection surface may be separate from the optical element, e.g. configured as a mirror element arranged to reflect light rays transmitted via the transparent optical element, or may be a part of the optical element such as a reflection-coated surface of the transparent optical element. Advantageously, the optical assembly may be configured, e.g. via the afore-mentions interconnected optically transparent components, so that incident and reflected light propagates solely through material having a refractive index which is greater than the refractive index of air. Advantageously, the incident and reflected light propagates solely through material having the same or substantially the same refractive index as the refractive index of the non-fluid body, the transparent optical element and/or the actuator component.

The interconnected optically transparent components may comprise the non-fluid body, the transparent optical element, the actuator component and/or other transparent optical components such as adhesives, lenses and other components such as prisms. Advantageously, where the non-fluid body has the same or substantially the same refractive index as the transparent optical element and/or the actuator component, the beam divergence is reduced through these components. It follows that also the other transparent optical components may advantageously have the same or substantially the same refractive index as the aforementioned optical components to reduced divergence and/or boundary reflections.

By means of the actuator system, the second surface of the non-fluid body can be affected to generate an optical effect such as an optical lens effect and/or an optical deflection of light rays.

Advantageously, the optical reflection surface provides a folding of the optical axis of the optical assembly so that different optical components can be placed in a way that reduces the size or certain dimensions of the optical assembly. The folding of the optical axis may enable a longer optical pathway, use of optical components which takes up more space along the optical axis and/or use of more optical components which may improve optical properties such as imaging quality.

Advantageously, the first surface of the non-fluid body abuts one of the first and second sides while the second surface of the non-fluid body abuts the actuator-component. The optical assembly may be configured so that there is direct contact between the first and second surfaces of the non-fluid body and the relevant side of the optical component and the actuator component, respectively. Furthermore, the non-fluid body may have the same or substantially the same refractive index as the transparent optical element and or the actuator component so that reflection at the boundary between components is reduced and so that anti-reflection coatings are not required. In practice, the same or substantially the same refractive index may include refractive indices which differ by less than e.g. 25% or less than 15%, 10% or 5%. In case anti-reflection coatings are used on any of the first, second or third sides of the optical element, the refractive indices may differ by more than 25%. A difference of 25% will end up with a reflectivity of $((1.5-1.5*1.25)/(1.5+1.5*1.25))^2=((1.5*0.25)/(1.5*2.25))^2$ i.e. in the range of 1%.

The displacement of the actuator-component may involve a translation where the actuator component is parallel displaced relative to the first surface of the transparent, deformable, non-fluid body. In an example where the actuator component is transparent and where the refractive indices of the non-fluid body and the actuator component, respectively the transparent optical element are different (which in practice normally will be the case), the reflectances at the boundaries between non-fluid body and the actuator component, respectively the transparent optical element constitutes an optical cavity or interferometer, e.g. a Fabry Perot interferometer. By adjusting the displacement of the actuator component, and thereby the separation between the two reflective boundaries, the spectral content of the light transmitted through the Fabry Perot interferometer can be filtered according to the optical filter properties of the interferometer. This may be used for damping intensities of certain wavelength ranges to generate spectrally resolved images. In another example, where the actuator component comprises the reflection surface, the spectral content of the light reflected through the Fabry Perot interferometer can be filtered in a similar way.

According to this first aspect, the optical assembly may be arranged so that the first surface of the non-fluid body abuts one of the first and second sides or so that the non-fluid body is arranged so that the first surface receives the deflected light ray.

According to an embodiment, the transparent optical element comprises at least first, second and third sides, where an angle between the first and second sides is less than 180 degrees, and where the third side is non-parallel with the first and second sides,
   where the optical reflection surface is arranged to deflect the light ray transmitted through the first side towards the second side, and
   where the transparent, deformable, non-fluid body comprising the first surface and the opposite second surface is arranged so that the first surface of the non-fluid body abuts one of the first, second and third sides.

For example, the optical element may be in the form of a prism having plane first, second and third sides, or where one or more of the first, second and third sides are curved.

The angle between the first and second sides may be less than 180 degrees. Examples of the angle between the first and second sides include values equal to or substantially equal to 30, 45, 60 or 90 degrees. In an example, the angle between the first and second sides is 90 degrees and the transparent optical element may be a right angled prism.

The third side is non-parallel with the first and second sides. Light rays transmitted into the optical element via the first side may be reflected by the third side in case the third side comprises the reflecting surface. Alternatively, light rays transmitted into the optical element via the first side may be transmitted out of the third side and reflected back via a reflecting surface such as a mirror located at a distance from the third side.

The optical reflection surface may be formed on or comprised by the third side, or the reflection surface may be separate from the optical element, e.g. in the form of a mirror element arranged to reflect light rays transmitted via the optical element.

Any of the at least first, second and third sides may have a plane surface or curved surface to provide an optical power.

Similarly to the first aspect, the non-fluid body abuts, or may contact, the third side with the same advantages as mentioned for the first aspect. Accordingly, the actuator component may be arranged with the third side in combination with non-fluid body.

According to an embodiment the actuator-component is a transparent cover member. The transparent cover member may be a plate-shaped member made of glass, polymer, polycarbonate, plastic or other material. The opposite surfaces of the plate-shaped member may be plane, or one or both of the opposite surfaces may have a curved surface.

The transparent cover member may have a suitable stiffness to enable bending by the one or more actuators. Alternatively, the stiffness may be selected to minimize bending in case only position and/or orientation change is intended.

Advantageously, the transparent cover member can provide adjustment of the optical power to provide an adjustable image focus. Alternatively, or additionally, the transparent cover member can generate beam deflection to provide an adjustable image location on the image sensor. This can be used to provide automatic focussing and/or image stabilisation by suitable electronic control of the one or more actuators.

According to an embodiment, the first surface of the non-fluid body abuts the first or the second side of the transparent optical element, and the one or more actuators are arranged to enable bending of the transparent cover member so that the non-fluid body and the transparent cover member forms a lens with an adjustable optical power.

For example, the one or more actuators may be controlled to generate displacement of the transparent cover member with equal or substantial displacement amplitudes along the same directions along the outer circumference to force the transparent cover member to bend outwardly or inwardly rotation symmetrically around the optical axis.

According to an embodiment, the first surface of the non-fluid body abuts the first or the second side of the transparent optical element, and the one or more actuators are arranged to enable displacement of the transparent cover member with different displacement amplitudes and/or directions along a circumference so that refraction at the transparent cover member enables deflection of the light ray by an adjustable angle.

Advantageously, the transparent cover member can be tilted by generating displacements of the transparent cover member with different displacement amplitudes and/or directions. The different displacement amplitudes may also be determined to provide both optical power and tilt. Thus, the embodiments may be combined so that one or more actuators are arranged to both enable displacement and/or bending of the transparent cover member.

Alternatively or additionally to providing optical power, the actuators and the associated control system may be configured to enable bending of the transparent cover member so that the non-fluid body and the transparent cover member generates astigmatism or other wave front errors, e.g. for the purpose of correcting wavefront errors of other optical components.

According to an embodiment, the actuator-component comprises the optical reflection surface, and the first surface of the non-fluid body abuts the third side of the transparent optical element, and the one or more actuators are arranged to enable displacement of the actuator-component along a circumference.

The displacement of the actuator-component may involve displacement with different displacement amplitudes and/or directions at actuation points along the circumference so that the optical reflection surface enables deflection of the light ray by an adjustable angle.

Advantageously, by applying different displacement amplitudes and/or directions of the displacements, the actuator component may be used as a reflector with an adjustable angle to provide adjustment of propagation direction of light rays reflected towards the second side of the transparent optical component. Particularly, the adjustment of the orientation of the reflector by a certain angle generates an angular correction of the reflected light rays by two-times the adjustment angle of the reflector. Thus, the mirror provides an effective way to adjust the direction of image rays and can be used for optical image stabilization.

Alternatively, the displacement of the actuator-component may involve displacement with equal or substantially equal displacement amplitudes in the same directions at the actuation points along the circumference so that the optical reflection surface is merely translated, e.g. parallel displaced, relative to the first surface of the transparent, deformable, non-fluid body.

The two reflective surfaces, i.e. the one of the actuator component and the refraction reflective boundary between the first surface of the non-fluid body and the third side of the optical transparent component constitutes an optical cavity or interferometer, e.g. a Fabry Perot interferometer. Accordingly by adjusting the distance between the two reflective surfaces, the spectral content of the light transmitted through the Fabry Perot interferometer can be filtered according to the optical filter properties of the interferometer. This may be used for damping intensities of certain wavelength ranges to generate spectrally resolved images.

The non-fluid body is merely sandwiched between the actuator-component and the third side so that the actuator-component and the reflection surface thereof may be arranged to be substantially parallel with the third side. However, other non-parallel configurations are also possible.

According to an embodiment, the optical assembly comprises two or more non-fluid bodies, where first sides of each of the non-fluid bodies abuts respective sides of the first, second and third sides, and where two or more actuator systems are arranged with the respective non-fluid bodies.

For example, one non-fluid body and an associated actuator component with a reflector surface may be arranged with the third side to provide angle adjustment of the reflected light rays; and another non-fluid body and an associated bendable actuator component (here a transparent cover member) may be arranged with the second side, or the first side, to provide optical power adjustments.

In another example, one non-fluid body and an associated actuator component (here a transparent cover member) may be arranged with any of the first, second or third side to provide angle adjustment of the refracted light rays; and another non-fluid body and an associated bendable actuator component (here a transparent cover member) may be arranged with the second side, or the first side, to provide optical power adjustments.

Thus, according to an embodiment, one of the non-fluid bodies is sandwiched between the first or the second side and the transparent cover member comprised by one of the actuator systems, and another of the non-fluid bodies is sandwiched between the third side and the optical reflection surface of the actuator-component comprised by another of the actuator systems.

According to an embodiment, the actuator system comprises one or more actuators, where each actuator can be a magnetic motor, a linear motor, a stepper motor, a thin piezo film actuator, a capacitive actuator or a bulk piezo actuator, or where the actuators of one or more actuator systems can be a combination of said actuator types.

Advantageously, in the case of two or more actuators, the actuators may be individually controllable to generate orientation adjustment of the actuator-component, According to an embodiment, the actuator system comprises a ring shaped actuator, the actuator-component is arranged to undergo bending by actuation of the ring shaped actuator and the ring shaped actuator allows transmission of the light ray through an inner portion of the ring shaped actuator.

According to an embodiment, the third side of the transparent optical element comprises the optical reflection surface. For example, the third side may be provided with reflective coating such as metal coating to obtain a reflection surface.

According to an embodiment, a height is less than 7.5 mm, such as less than 4.9 mm, such as less than 4.5 mm, such as less than 4.0 mm, such as less than 3.5 mm, such as less than 3.0 mm, such as less than 2.8 mm. The height is generally understood as a the largest extension of the optical assembly in a direction perpendicular to the first surface.

According to an embodiment, the transparent optical element is monolithic, i.e. the optical element is fabricated from a single material. A single-material element may reduce production costs. However, transparent optical element could also be made from two or more different materials.

According to an embodiment, the transparent optical element is a prism.

According to an embodiment, the third side is parallel or substantially parallel with the optical reflection surface. This is clearly the case when the reflection surface is formed on, or is part of, the third surface. When the reflection surface is separate from the transparent optical element, they need not be parallel, but could be parallel or substantially parallel.

According to an embodiment, the optical reflection surface provides partial reflection. Advantageously, the reflection surface may be a partial reflector which transmits a fraction of the incident optical intensity. The transmitted light could be measured by an optical sensor for various purposes.

A second aspect of the invention relates to a camera module comprising an optical assembly according to the first aspect.

According to an embodiment of the second aspect, the camera module a cover glass of the camera module comprises the transparent optical element. Advantageously, the transparent optical element may be used as a cover glass so that the first side forms the external window in the camera module. Alternatively, the first side of the transparent optical element may be protected by a thin transparent plate, such as a replaceable protective window.

According to an embodiment of the second aspect, the camera module comprises a processor for controlling the actuator system so as to carry out optical image stabilisation and/or image focusing.

According to an embodiment of the second aspect, an image sensor is arranged to receive the light ray transmitted through the second side of the transparent optical element. It is understood that further optical components such as lenses or an assembly of lenses may be arranged between the image sensor and second side or the transparent cover member (i.e. the output of the optical assembly).

A third aspect of the invention relates to a method for manufacturing an optical assembly according to the first aspect, said method comprising:
  providing a transparent optical element with at least first and second sides,
  providing an optical reflection surface arranged to deflect a light ray transmitted through the first side,
  providing a transparent, deformable, non-fluid body comprising a first surface and an opposite second surface, wherein the optical reflection surface (102a, 102b, 102c), the first surface (131) of the non-fluid body and the first and second sides (111, 112) of the transparent optical element (101) are connected via one or more interconnected optically transparent components, and wherein the refractive index throughout the connection is greater than the refractive index of air, and
  providing an actuator system comprising one or more actuators and an actuator-component arranged to undergo bending and/or displacement by the one or more actuators, where a side of the actuator-component abuts the second surface of the non-fluid body.

Thus, by means of the actuator system the shape, orientation and/or the parallel displaced position of the second surface of the non-fluid body can be changed by actuation of the actuators A fourth aspect of the invention relates to an electronic device comprising a camera module according to the second aspect, wherein the electronic device is any one of:
  a. A telephone, such as a smartphone,
  b. A watch, such as a smartwatch,
  c. A tablet, such as an iPad®,
  d. A laptop, and
  e. A camera.

A fifth aspect of the invention relates to the use of an electronic device comprising a camera module according to the second aspect for obtaining images.

In general, the various aspects and embodiments of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which FIGS. 3A-3E illustrate different actuator configurations and deformation, tilt and displacement of the actuator component due to actuator effects.

DETAILED DESCRIPTION OF EMBODIMENTS

Figure 2A:
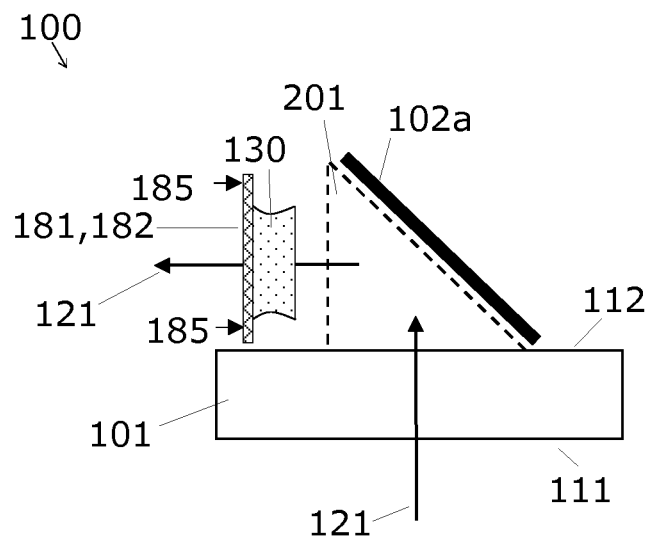
FIG. 2A shows an alternative embodiment of the optical assembly where the transparent optical element has as least three primary sides which are arranged to transmit or reflect the received light.
Figure 2B:
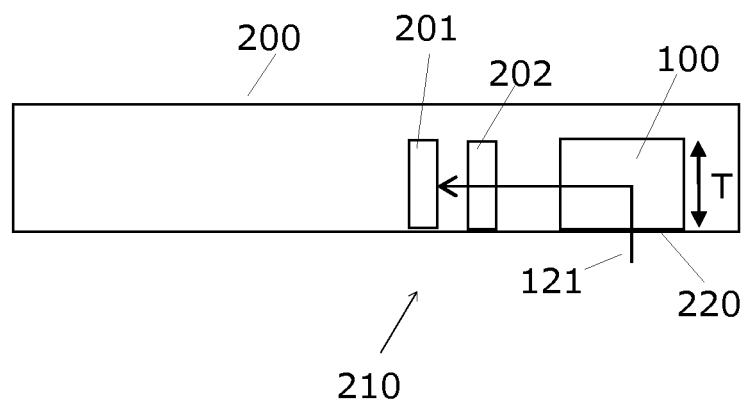
FIG. 2B shows a principal sketch of an electronic device configured with the optical assembly.

FIG. 2B shows a cross-sectional view of electronic device 200 such as a smartphone, a tablet or a part of a laptop or other device. The device 200 comprises an optical assembly 100 which is arranged to receive light via an aperture 220 and to deflect light rays of the received light into a propagation direction, e.g. a propagation direction which allows the deflected light to propagate along an elongate direction of the electronic device. The elongate length of the device 200 may be significantly longer than the thickness of the device, where the thickness extends in a direction perpendicular or substantially perpendicular to a plane of the aperture 220.

The optical assembly 100 forms part of a camera module 210 which may further comprise an image sensor 201 arranged to receive the deflected light and optionally lenses 202 or other optical components arranged in the pathway of the deflected light.

It may be desirable to reduce the thickness of the electronic device 200. This may require a corresponding reduction of the thickness T of the optical assembly 100 and the camera module 210 can be contained within the boundaries of the electronic device 200. Accordingly, a configuration without beam folding may be too long to enable a slim design. On the other hand use of a deflector increases complexity and may reduce image quality due to added tolerances.

Figure 1A:
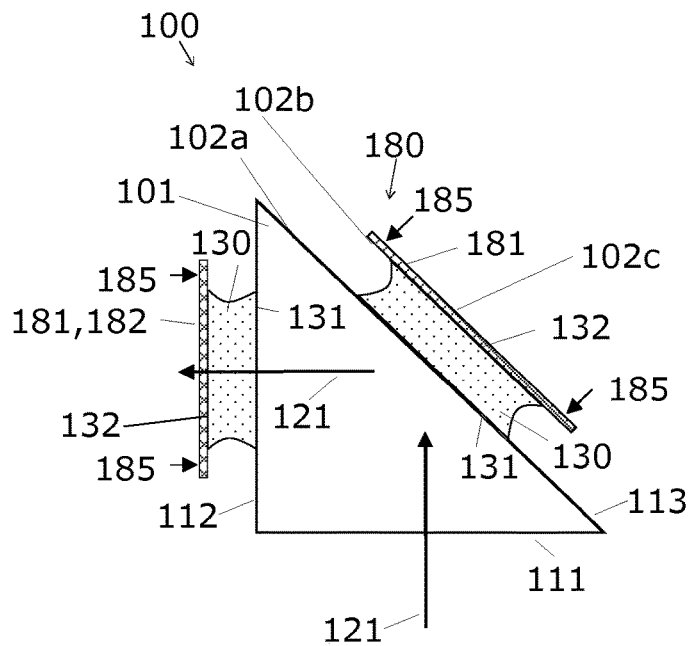
FIG. 1A shows an example of an optical assembly which comprises a transparent optical element.
Figure 1C:
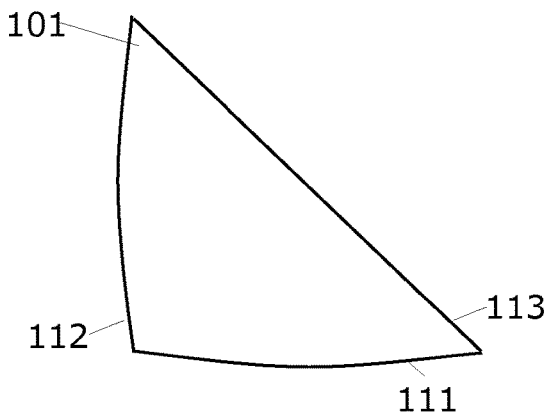
FIG. 1C illustrates an example of the transparent optical element with curved sides.

FIG. 1A shows an example of an optical assembly 100 which comprises a transparent optical element 101. The optical element may be a solid transparent element which comprises at least first, second and third sides 111-113. Any one of the sides 111-113 may form plane surfaces or curved surfaces, e.g. as illustrated in FIG. 1C. A curved surface may be comprised by a plane side 111-113, e.g. an inward or outward curved surface may be formed on a part of a plane side. For example, a curved surface on any of the sides may provide optical refraction which depends on the incident angle of the light ray, i.e. optical power, e.g. to provide an optical focusing or spreading effect. All of the first, second and third sides 111-113 may form plane surfaces, i.e. so that the optical element 101 constitutes a prism. The first, second and third sides of the optical element may include any combination of curved and plane sides. In this example, the angle between the first and second sides 111, 112 is less than 180 degrees, e.g. 90 degrees, and the third side 113 is non-parallel with the first and second sides. As illustrated, the optical element 101 may be a right angled prism. Although, a prism is normally understood to have plane sides, in this document it is understood that a prism may comprise curved surfaces.

The optical assembly 100 further comprises an optical reflection surface 102a, 102b, 102c arranged to deflect a light ray 121 transmitted through the first side 111. The reflection surface, i.e. a mirror, may be arranged on the third surface 113 as a reflection surface 102a, or on a surface of an actuator-component 181, i.e. as a reflection surface 102b on the surface facing the optical transparent element 101 or as a reflection surface 102c on the opposite surface. For convenience, since the either of the reflections surfaces 102a, 102b, 102c can be used, a reference to a generalized reflection surface 102 is used when the reflection surface 102 could be any of the reflection surfaces 102a, 102b, 102c or when it is clear from the context what type of reflection surface is referred to.

The reflection surface 102 could also be provided on other elements such as another prism or other mirror element. The reflection surface 102 may comprise a metal layer coted on a surface of the optical component 101 or actuator-component 181. Accordingly, the reflection surface 102 may be parallel or substantially parallel with the third side 113.

The actuator component 181, 182 itself may be slab-shaped with parallel surfaces, or the actuator component may be curved. The curved configuration may be achieved in that one or both of the major opposite surfaces are curved. Accordingly, the reflection surface 102 being a surface of the actuator component 181 or the third side 113 may be curved.

Accordingly, the actuator component 181, 182 in the configuration of a transparent element may be configured to provide refractive optical power, or the actuator component 181, 182 in the configuration of a mirror element may be configured to provide reflective optical power.

Further, the actuator component 181, 182 such as the side facing the optical component 101 may be configured with optical functions other than the mirror functions. Accordingly, the actuator component 181, 182 may be configured with a grating, micro lenses or a nanostructured imprinted surface to reshape at least a part of the transmitted or reflected light such that this can be used for other purposes, e.g. feedback loop control of an optical component, sensing of light parameters and other purposes. In an example, the mirror configuration of the actuator component 181, 182 or the mirror surface 102 could be configured as a dichroic mirror to provide a spectral band pass filter.

The possible curved surfaces of any of the actuator component and the at least first, second and third sides may be curved in one or two dimensions.

According to an embodiment, the optical reflection surface 102 is configured as a partial reflector so that a fraction of the light intensity is transmitted through the reflection surface. The fraction of transmitted light may be measured by an optical sensor and used for controlling the actuator systems 180. An application of the partial reflector is to provide a feedback loop based on the light intensity transmitted through the partial mirror, where the transmitted light can be measured and compared with the reference of the feedback loop in order to control the lens focus or mirror tilt.

The optical assembly 100 further comprises a transparent, deformable, non-fluid body 130 such as an elastic polymer-material. The non-fluid body 130 comprises a first surface 131 and an opposite second surface 132. The first surface abuts, i.e. contacts, one of the first, second or third second sides 111-113. Alternatively, the non-fluid body 130, or one or more of a plurality of such bodies 130 may be arranged as a separate component which does not contact any of the first, second or third sides 111-113.

The deformable, non-fluid lens body is preferably made from an elastic material. Since the lens body is non-fluid, no tight enclosure is needed to hold the lens body, and there are no risk of leakage. In a preferred embodiment, the lens body is made from a soft polymer, which may include a number of different materials, such as silicone, polymer gels, a polymer network of cross-linked or partly cross-linked polymers, and a miscible oil or combination of oils. The elastic modulus of the non-fluid lens body may be larger than 300 Pa, thereby avoiding deformation due to gravitational forces in normal operation. The refractive index of the non-fluid lens body may be larger than 1.3.

Using a soft polymer makes it possible to produce lenses where the polymer is in contact with air, thus requiring much less force when adjusting the focal length of the lens. It also eases the production, as the polymer will keep in place even if the different production steps are localized in different positions or facilities. As mentioned above it also makes it possible to provide leakage channels or bubbles of compressible gas in order to reduce the required force necessary to adjust the lens and to reduce the strains caused by temperature and pressure fluctuations in the environment.

The optical assembly 100 further comprises an actuator system 180 which comprises one or more actuators 185 and an actuator-component 181, 182. The actuator-component 181, 182 is flexible and has a suitable stiffness to enable bending by actuation of the actuators 185. The actuator component may be configured as a transparent or non-transparent, e.g. slab-shaped, element. The actuator component 181 may be a metal, glass or plastic element, or it may be made from other materials. Alternatively or additionally, the actuator-component 181, 182 is arranged to be displaced by actuation of the actuators 185. Accordingly, the actuator component may have a stiffness which enables bending, but which is also sufficiently stiff to enable translation by actuation of the actuators. In order to achieve sufficient stiffness, the actuator-component may comprise a stiffener element such as stiffener ring and the actuators may be arranged to act on the stiffener element. In the illustrated embodiment, a side of the actuator-component abuts, i.e. contacts the second surface 132 of the non-fluid body. The non-fluid body 130 has an elasticity and is deformable so that the second surface 132 remains in contact with said side of the actuator-component when the actuator component undergoes bending and/or displacement. Accordingly, the shape and/or orientation of the second surface 132 of the non-fluid body can be changed by actuation of the actuators.

The non-fluid body 130 and its associated actuator system 180 can be arranged with any one or more of the first, second or third second sides 111-113.

For example, when the non-fluid body 130 and the actuator system 180 are arranged with the third surface, the actuator component 181 may have a reflective surface, i.e. a mirror surface providing partial or total reflection, which contacts the second surface 132 of the non-fluid body 130 or is arranged on the opposite side of the actuator component 181 which may be a transparent element, e.g. a glass plate. Thus, the angle of deflection of incident light rays can be controlled by controlling the orientation of the actuator component 181 relative to the third surface 113 by use of the actuators 185.

The controlled ray deflection can be used to provide optical image stabilization, i.e. to compensate shaking of the electronic device 200 during optical imaging.

As can be obtained by use of the reflection law, this arrangement of the mirror surface 102 generates a factor of two amplification of the ratio of the resulting change of ray deflection and the change or the angle of the actuator component 181.

Alternatively or additionally, the non-fluid body 130 and the actuator system 180 may be arranged with the first or second surface. In this case, the actuator component 181 is a transparent actuator component 182. The actuator component may be arranged to be deformed to attain a spherical or aspherical surface, preferably rotational symmetric around the optical axis by actuation of the actuators 185 (for convenience the actuators are not shown with the first side 111). The optical axis (not illustrated) is the line that defines the path along which light propagates through optical assembly. In this way the refraction of the light ray at the outward surface of the transparent actuator component 182 provides an adjustable optical power which can be used to adjust the focal distance of the lens formed by the non-fluid body 130 and the actuator component 182. The adjustable optical power can be used to provide a variable focus length and for auto-focusing of the camera module 210.

The non-fluid body 130 may have a refractive index which is equal, substantially equal or close to the refractive index of the optical element 101 and/or the actuator component 181, 182. Other optical transparent components arranged to connect e.g. the optical transparent component 101 with the non-fluid body 130, or other optical elements described herein, may also have refractive indices that are equal, substantially equal or close to the refractive index of the non-fluid body 130 or other components, and which is higher than the refractive index of air. In this way, light transmitted through the interconnected optical components may experience less reflection losses and less divergence.

The one or more actuators may be controlled by an electronic circuit and/or a digital processor in order to generate a desired change of optical power or deflection. The control may be a feedforward control based on input signals relating to the desired optical change or optical result, or the control may be a feedback control where the input signals relating to the desired optical change or result is compared with measured signals of the actual change or result. The processor may be comprised by the optical assembly 100 or the camera module 210. For example, the processor may be programmed to control the actuators in an optical image stabilization and/or autofocus mode based on input from 2D or 3D motion sensors which are arranged to measure motion of the actuator component 181,182 and/or to measure focus level by a focus detector comprised by the optical assembly 100. The focus detector could be active or passive, such as a phase detection or contrast detection auto focus sensor. The actuators 185 may be arranged to provide optical image stabilization in one dimension only by tilting the actuator component about one axis, or to provide optical image stabilization in two dimensions by tilting the actuator component about up to two axes.

Additionally, the one or more actuators may be controlled to provide controlled beam steering, e.g. in an application where the optical assembly is configured for use in an image projecting device and where the focus/optical power and/or the tilt of the mirrors of the actuator element 181 are controlled in order to obtain stable and focused image projection.

Figure 1B:
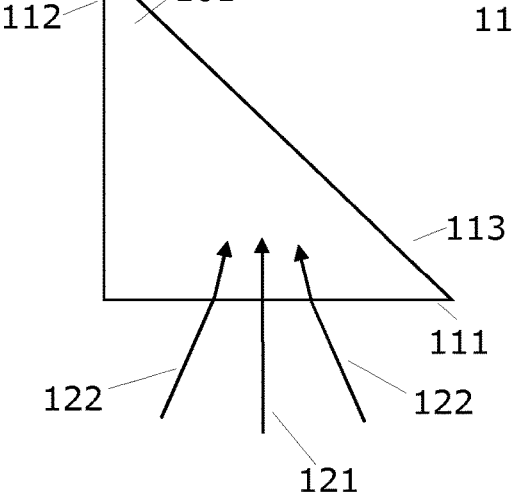
FIG. 1B illustrates advantageous beam confinement due to optical element.

FIG. 1B illustrates an advantageous effect obtained by use of the optical element 101. Due to the refractive index of the optical element 101 which is higher than the refractive index of the surroundings, e.g. air, the angles of incidence of the rays 122 which impinges the first surface 111 with an angle of incidence different from 0 degrees, i.e. so that the rays makes an angle with the first surface 111 different from 90 degrees, will be reduced when propagating within the optical element. Thus, the spreading of light rays is reduced due to the refraction. This has the effect that the required area of the third side 113 as well as the area of the second side 112 is reduced as compared with a situation where the light rays 121, 122 propagates in air. As a consequence, the height of the actuator system 180, i.e. the height along a longitudinal dimension of the actuator component 181, 182 can be reduced, e.g. to a height lower than 7.5 mm, such as lower than 4.9 mm or 4.5 mm. Accordingly, use of an optical element such as a prism to generate beam folding is advantageous as compared to the use of a mirror where the light propagates in air.

Thus, even though the reflection surface and the optical component may increase complexity and possibly reduce image quality, the combination of the actuator system 180 with the reflection surface and the optical component adds functionalities such as focus and/or deflection adjustment functionalities. The actuator system and non-fluid body can be utilized in different ways with the optical element which exploits the presence of the sides 111-113 for achieving the focus and/or beam deflection properties.

Further, in combination with the optical element, beam expansion is reduced so that the lateral size of the non-fluid body 130 and the actuator component 181, 182 is minimized.

FIG. 2A shows an alternative embodiment of the optical assembly 100 where the transparent optical element 101 comprises at least first and second sides and where the first and second sides may be parallel or substantially parallel. The first side 111 may constitute an input aperture arranged to receive light and the second side 112 may constitute an output aperture arranged to emit light towards the mirror or reflection surface 102. For example, the optical element 101 may be in the form of a plate or block of a transparent glass or plastic material. Advantageously, the optical element 101 in FIG. 2A provides the same advantageous effect with respect to reducing the spreading of light rays as described in connection with FIG. 1B.

The reflection surface is arranged on a surface of a prism or other optical solid element 201 having a side which contacts the second side 112 of the optical element 101. The optical solid element 201 is transparent.

Thus, the optical solid element 201 is an example of an interconnecting optical transparent component arranged to connect the reflection surface 102 with the non-fluid body 130 and the transparent optical element 101 so that light transmitted from the second side 112 of the transparent optical element 101 to the first surface 131 of the non-fluid body 130 experiences a refractive index throughout the connection which is greater the refractive index of air and preferably a refractive index which does not change significantly at interfaces between optical components.

Actuator systems 180 and associated non-fluid bodies 130 may be arranged with any one or more of the first and second side 111, 112, with the angled surface of the optical solid element 201 or the surface of the optical solid element 201 which is perpendicular with first and second sides 111, 112. Alternatively or additionally, an actuator system 180 and associated non-fluid body 130 could be arranged separated from any of the optical element 101 or optical solid element 201.

The optical solid element 201 could be termed as a second transparent optical element 201, considering the transparent optical element 101 as a first transparent optical element.

The example, where the transparent optical element 101 and the optical solid element 201 is arranged so that sides of the respective components makes contact, e.g. by use of a suitable transparent adhesive, may be advantageous for obtaining a transparent optical element having a reflection surface and input and output sides for receiving and outputting light rays 121.

Accordingly, transparent optical element 101 may be in the form of a single optical element or may comprise two or more transparent optical elements.

Figure 4A:
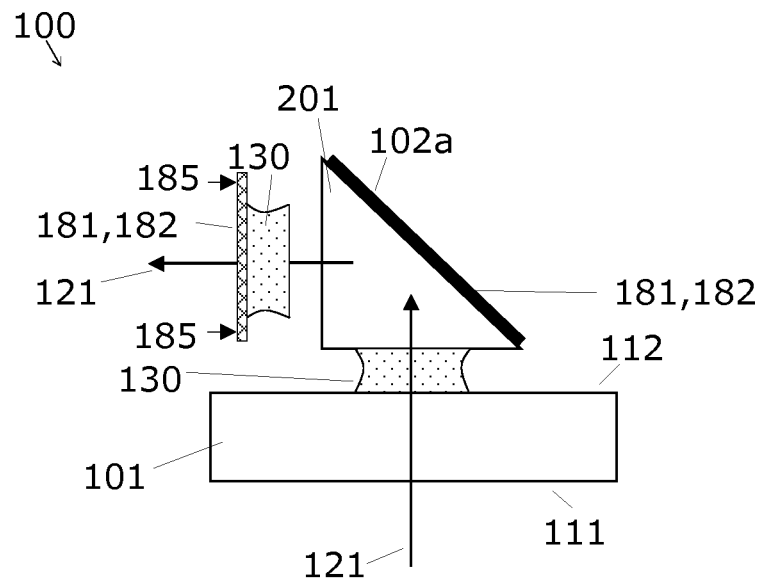
FIG. 4A shows another alternative configuration of the optical assembly.

FIG. 4A shows an alternative configuration of the optical assembly 100 where the transparent optical element 101 is an element with at least first and second sides such as a transparent optical element with opposing, parallel or non-parallel, first and second sides and where the optical assembly 100 comprises the optical solid element 201. In this example, the optical solid element 201 is a prism with a reflection surface arranged to deflect a light ray 121 received via one of the perpendicular sides towards the other perpendicular side. The transparent deformable non-fluid body 130 is sandwiched between the side of the optical solid element 201 which is arranged to receive light and the second side 112 of the transparent optical element 101. The actuator system 180 associated with said deformable non-fluid body 130 (not shown) may be arranged to affect the orientation of the optical solid element 201 alternatively the transparent optical element 101, in order to provide the beam deflection adjustment functionality. Thus, in this example, the optical solid element 201, alternatively the transparent optical element 101, constitutes the actuator component.

Alternatively, the transparent deformable non-fluid body 130 sandwiched between the optical solid element 201 and the transparent optical element 101 may be applied as a passive non-fluid body 130, i.e. without associated actuators.

The transparent deformable non-fluid body 130 sandwiched between the optical solid element 201 and the transparent optical element 101 may be the same non-fluid substance as used in combination with the actuator component 181, 182 or it may be another transparent adhesive. The non-fluid body 130 sandwiched between the optical solid element 201 and the transparent optical element 101 may be used to provide refractive index matching between the optical solid element 201 and the transparent optical element 101, to allow tolerances of the element 201 and the transparent optical element 101 such as positioning tolerances and may be used to provide a high-refractive index optical pathway as compared to an air gap between the elements.

The non-fluid body 130 arranged to receive the reflected light transmitted by the optical solid element 201 may be arranged to abut a side of the optical solid element 201 and may be connected to the optical solid element 201 via an interconnecting optical transparent component.

Figure 4B:
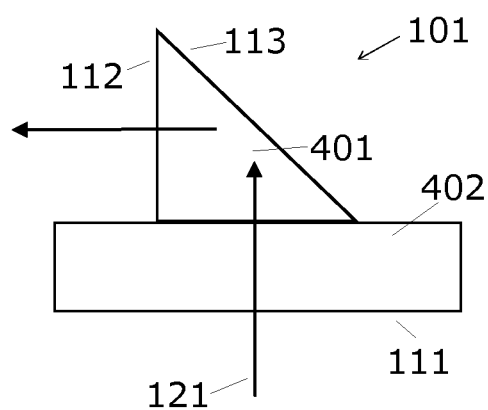
FIG. 4B shows an example of the transparent optical element.

FIG. 4B shows an example of the optical element 101 which has the shape of a prism 401 combined with a slab-shape element 402. The prism 401 and the slab-shape element 402 may be glued together or the element may be formed as a monolithic optical element, e.g. as moulded plastic element. The first side 111 may form the entrance window for a camera, e.g. the entrance window of a camera in an electronic device 200. The second side 112 can have functions as described in other examples herein. The third side 113 is used for providing beam deflection via an optical reflection surface 102 (not shown in FIG. 4B) configured according the examples herein.

According to an embodiment of the invention, the optical reflection surface, the first surface of the non-fluid body and the first and second sides of the transparent optical element are connected via one or more interconnected optically transparent components, and wherein the refractive index throughout the connection is greater than the refractive index of air. It is seen that this embodiment is supported by the embodiment of FIG. 2A with the non-fluid body 130 and the optical element 101 arranged to contact the optical solid element 201. This embodiment is further supported by the embodiments of FIG. 4A and FIG. 4B with the non-fluid body 130 arranged to contact the optical solid element 201. This embodiment is similarly supported by the embodiment in FIG. 1A.

FIG. 3A illustrates a top view of the actuator component 181, 182 where the actuator 185 comprises a ring shaped actuator such as a ring shaped piezo element arranged to generate bending of the actuator component 181, 182, particularly the transparent component 181.

FIG. 3B illustrates a top view of the actuator component 181, 182 where the actuator system 180 comprises two or more individually controllable actuators 185. Such individually controllable actuators may be constituted by, including combinations of, magnetic motors, linear motors, stepper motors, thin piezo film actuators, capacitive actuators or bulk piezo actuators. Clearly, different actuator systems 180 may be configured with different types of the ring shaped actuators 185 or individually controllable actuators 185. For example, one actuator system 180 arranged to generate bending of an actuator component 181, 182 may comprise as a ring shaped piezo element, whereas another actuator system 180 arranged to generate displacement of an actuator component 181, 182 may comprise individually controllable actuators arranged to generate a displacements in a direction parallel or substantially parallel with the optical axis.

FIG. 3C illustrates an example of bending of the actuator component 181, 182. Bending may be obtained by any of the actuators 185 including individually controllable actuators arranged e.g. to provide a force in the same direction, alternatively torques, along a circumference of the actuator component 181, 182.

FIG. 3D illustrates an example of changing the orientation and/or position of the actuator component 181, 182. This may be achieved by controlling the individually controllable actuators to provide different forces or displacements in the same direction along a circumference of the actuator component 181, 182, or by controlling the controllable actuators to provide forces or displacements in different such as opposite directions along a circumference of the actuator component 181, 182.

As illustrated in FIG. 3E, the principally illustrated individually controllable actuators 185 may be positioned between the actuator component 181, 182 and one of the sides 111-113 of the optical element 101 to reduce the overall size of the lens assembly 100.

For example, the individually controllable actuators may be configured as voice coil, i.e. a linear electromagnet motor comprising magnet and a coil which are linearly displaceable relative to each other. The linear displacement can be controlled by controlling the current supplied to the coil. The displaceable end of the actuator can be arranged to engage with the actuator component 181, 182, while a stationary part of the actuator can be fixed support frame of the optical assembly 100 or other stationary part such as the optical element 101.

According to another example, the individually controllable actuators may be configured as cantilevered beam actuators where the free end of the beam provides linear or substantially linear displacement. The beam may be configured as a bimorph piezoelectric cantilevered beam so that the displacement can be controlled by controlling the current supplied to the piezoelectric element(s). The end of the beam opposite to the free end can be fixed to a support frame of the optical assembly 100 or other stationary part. The beams can be arranged so that they extend in a direction tangential to the points where the free end connects the actuator component 181, 182.

Three or more individually controllable actuators 185 may be controlled in synchrony to change the shape and/or orientation of the actuator component 181, 182 to achieve a desired optical effect. For example, all actuators can be addressed to exert a force in the same direction to move the circumferential part of the actuator component 181, 182 forward or backward along the optical axis. In this way, the optical power provided by the actuator component 181, 182 can be adjusted. According to another functionality of the actuator system 180, the actuators 185 can be addressed to apply different forces (including different directions and/or amplitudes) to the actuator component that varies along the circumference of the actuator component. This actuation could generate a tilting of the actuator component without substantial changes optical power of the actuator component. Further, this actuation could generate both a tilting of the actuator component and a change in the optical power of the actuator component, i.e. a combination of the bending and the change of orientation/position as illustrated in FIG. 3C and FIG. 3D.

The actuator 185 in the form of a ring shaped actuator such as a ring shaped piezoelectric element is arranged centered at the optical axis 301 so that the hole of the piezoelectric ring allows transmission of the light rays 121. By supplying a current to the piezoelectric ring, or by electrical excitation of another ring shaped actuator, the ring contracts or expands tangentially, essentially rotation symmetric relative to the optical axis 301. The generated forces are transferred to the actuator component 181, 182 which causes bending of the actuator component in an inward or outward direction and thereby creates or adjusts optical power of the lens which comprises the actuator component and the non-fluid, elastic component 130.

FIG. 3E shows the distance d between the first surface 131 and the second surface 132 of the non-fluid body, i.e. the distance between any of the first, second or third sides 111-113 and the surface of the actuator component 181, 182 facing the non-fluid body 130. The distanced is controllable by means of the actuators 185 and the control thereof, e.g. in an interval between 100-1000 nm or in the interval between 0.1 µm to 500 µm (micrometer) such as the interval between 1 µm to 500 µm or between 10 µm to 500 µm.

In an example, where the actuator-component 181, 182 is plane and the first, second or third side 111-113 is also plane, the cavity between the first and second surfaces 131, 132 constitutes a Fabry Perot interferometer. Accordingly, the separation d between the reflective boundaries of the Fabry Perot interferometer can be adjusted by the one or more actuators 185.

In a first example, the actuator component 181, 182 is transparent. The boundary between the first surface 131 and the first, second or third side 111-113 of the transparent optical element 101 has a reflectance R1 and the boundary between the second surface 132 and the actuator component has a reflectance R2 which are given according to the differences of refractive indices n1 of the actuator component, n2 of the non-fluid body and n3 of the transparent optical element 101, i.e. n1≠n2 and n3≠n2. In this example, the Fabry Perot interferometer is a transmission Fabry Perot interferometer.

In a second example, the actuator component 181 comprises the reflection surface 102b, 102c which constitutes one of the reflective boundaries of the Fabry Perot interferometer. The other reflective boundary of the Fabry Perot interferometer is constituted by the boundary between the first surface 131 and third side 113. In this example, the Fabry Perot interferometer is a reflection Fabry Perot interferometer.

Figure 5:
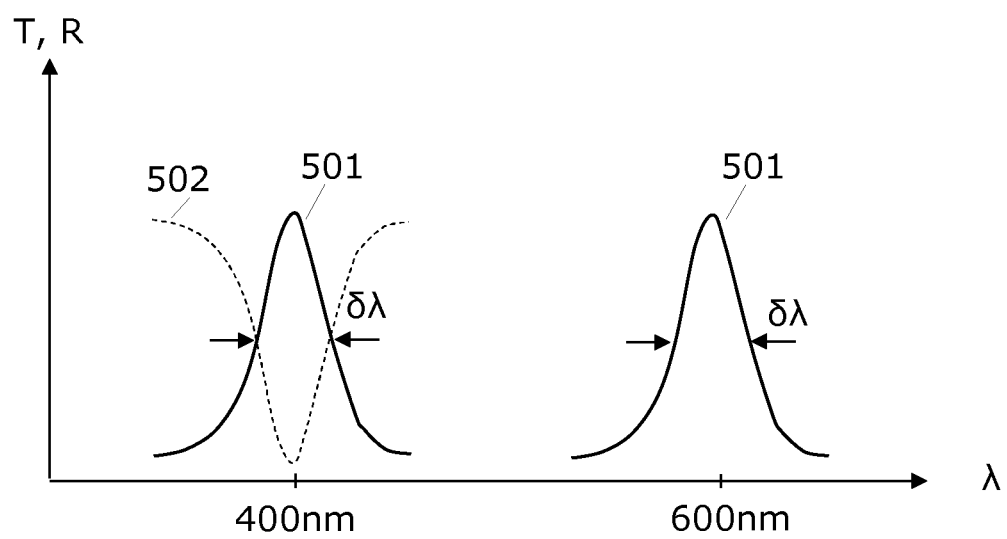
FIG. 5 shows reflectance and transmission characteristics.

FIG. 5 shows how the Fabry Perot interferometer can be used to obtain an adjustable filter effect where the spectral content of the light transmitted or reflected by the Fabry Perot interferometer can be filtered according to the optical filter properties of the interferometer.

In an example where the Fabry Perot interferometer comprises a transparent actuator component 181, 182, the spectral transmission is given by curve 501 which has a width δλ. The intensity of transmitted light for wavelengths λ outside the curve 501 is damped (i.e. the transmission coefficient T is low) whereas the intensity of transmitted light for wavelengths within the curve 501 experience a higher transmission coefficient. The width δλ depends on the product of the reflectivities R1 and R2 in a way so that a low value of the product R1×R2 gives a high width δλ and a high value of the product R1×R2 gives a narrow width δλ. The spectral location of the peak of the curve 501 depends on the distance d. Thus, by adjusting the distance d, the spectral location of the curves 501 and thereby the selection of transmitted or reflected wavelengths can be adjusted.

In an example, the reflectivity at the boundaries of the first and second surfaces 131, 132 are approximately each 46%. With these reflectivities the width OA is approximately 100 nm. The distance d between the first and second surfaces 131, 131 can be adjusted from 258 nm or less to 387 nm or more. At the 258 nm distance, the peak of the curve 501 is located at about 400 nm. At the 287 nm distance, the peak of the curve 501 is located at about 600 nm. Thus, the transmission of wavelengths within the 100 nm band can be shifted in the interval from 400 to 600 nm. The reflectivity of 46% or other relative high reflectivities may be achieved by deposition of metallic or dielectric materials on any of the first, second and third sides 111-113 and/or on the surface of the actuator component 181, 182 abutting the non-fluid body 130, alternatively the opposite surface of the plate-shaped actuator component 181, 182.

As mentioned above, it is also possible to achieve the reflectivities of the Fabry Perot interferometer by means of the differences in refractive indices, but with significant lower reflectivities than 46%.

In the example where the actuator component 181 has a mirror surface, i.e. the reflection surface 102b, 102c, the spectral reflection characteristic is given by the curve 502. For convenience, the curve 502 is only shown at the 400 nm location, but can be shifted to the 600 nm position. Thus, in the reflection mode of the Fabry Perot interferometer, the intensity of reflected light for wavelengths A outside the curve 502 is not significantly damped (i.e. the reflection coefficient R is high) whereas the intensity of transmitted light for wavelengths within the curve 502 experiences a damping effect, i.e. the reflection coefficient R is low.

Although the present invention has been described in connection with the specified embodiments, it should not be construed as being in any way limited to the presented examples. The scope of the present invention is to be interpreted in the light of the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. An optical assembly comprising,
    a transparent optical element comprising at least first, second and third sides, wherein an angle between the first and second sides is less than 180 degrees, and wherein the third side is non-parallel with the first and second sides,
    an optical reflection surface configured to deflect a light ray transmitted through the first side,
    a transparent, deformable, non-fluid body comprising a first surface and an opposite second surface, wherein the optical reflection surface, the first surface of the non-fluid body and the first and second sides of the transparent optical element are connected via one or more interconnected optically transparent components, and wherein the refractive index throughout the connection is greater than the refractive index of air,
    an actuator system comprising one or more actuators and an actuator-component configured to undergo bending and/or displacement by the one or more actuators, wherein a side of the actuator-component abuts the second surface of the non-fluid body, wherein
    the one or more interconnected optically transparent components comprises the non-fluid body and the transparent optical element, wherein the non-fluid body has the same or substantially the same refractive index as the transparent optical element and/or the actuator component, and wherein
    the third side of the transparent optical element comprises the optical reflection surface, alternatively,
    the actuator-component comprises the optical reflection surface arranged as a reflection surface on the surface of the actuator-component facing the optical transparent element or arranged as a reflection surface on the opposite surface of the actuator-component wherein the first surface of the non-fluid body abuts the third side of the transparent optical element,
    whereby
    the optical reflection surface is configured to deflect the light ray transmitted through the first side towards the second side.

2. The optical assembly according to claim 1, wherein the one or more interconnected optically transparent components has the same or substantially the same refractive index.

3. The optical assembly according to claim 1,
    wherein the transparent, deformable, non-fluid body comprising the first surface and the opposite second surface is configured such that the first surface of the non-fluid body abuts one of the first, second and third sides.

4. The optical assembly according to claim 1, wherein the actuator-component is a transparent cover member.

5. The optical assembly according to claim 4, wherein the first surface of the non-fluid body abuts the first or the second side of the transparent optical element, and wherein the one or more actuators are configured to enable bending of the transparent cover member so that the non-fluid body and the transparent cover member forms a lens with an adjustable optical power.

6. The optical assembly according to claim 4, wherein the first surface of the non-fluid body abuts the first or the second side of the transparent optical element, and wherein the one or more actuators are configured to enable displacement of the transparent cover member with different displacement amplitudes and/or directions along a circumference so that refraction at the transparent cover member enables deflection of the light ray by an adjustable angle.

7. The optical assembly according to claim 1, wherein the actuator-component comprises the optical reflection surface, and wherein the first surface of the non-fluid body abuts the third side of the transparent optical element, and wherein the one or more actuators are configured to enable displacement of the actuator-component along a circumference.

8. The optical assembly according to claim 1, comprising,
    two or more non-fluid bodies, wherein first sides of each of the non-fluid bodies abuts respective sides of the first, second and third sides, and
    two or more actuator systems are arranged with the respective non-fluid bodies.

9. The optical assembly according to claim 8, wherein one of the non-fluid bodies is sandwiched between the first or the second side and the transparent cover member comprised by one of the actuator systems, and wherein another of the non-fluid bodies is sandwiched between the third side and the actuator-component comprised by another of the actuator systems.

10. The optical assembly according to claim 1, wherein the actuator system comprises one or more actuators, wherein each actuator is selected from a magnetic motor, a linear motor, a stepper motor, a thin piezo film actuator, a capacitive actuator or a bulk piezo actuator, or wherein the actuators of one or more actuator systems are a combination of said actuator types.

11. The optical assembly according to claim 1, wherein the actuator system comprises a ring shaped actuator, wherein the actuator-component is configured to undergo bending by actuation of the ring shaped actuator and wherein the ring shaped actuator allows transmission of the light ray through an inner portion of the ring shaped actuator.

12. An optical assembly according to claim 1, wherein a thickness of the optical assembly is less than 7.5 mm.

13. The optical assembly according to claim 1, wherein the transparent optical element is monolithic.

14. The optical assembly according to claim 1, wherein the transparent optical element is a prism.

15. The optical assembly according to claim 1, wherein the third side is parallel or substantially parallel with the optical reflection surface.

16. The optical assembly according to claim 1, wherein the optical reflection surface provides partial reflection.

17. A camera module comprising an optical assembly according to claim 1.

18. The camera module according to claim 17, wherein a cover glass of the camera module comprises the transparent optical element.

19. The camera module according to claim 17, wherein the camera module comprises a processor for controlling the actuator system so as to carry out optical image stabilisation and/or image focusing.

20. The camera module according to claim 17, comprising an image sensor, wherein the image sensor is configured to receive the light ray transmitted through the second side of the transparent optical element.

21. A method for manufacturing an optical assembly according to claim 1, said method comprising:
providing a transparent optical element comprising at least first, second and third sides, wherein an angle between the first and second sides is less than 180 degrees, and wherein the third side is non-parallel with the first and second sides,
providing an optical reflection surface configured to deflect a light ray transmitted through the first side,
providing a transparent, deformable, non-fluid body comprising a first surface and an opposite second surface, wherein the optical reflection surface, the first surface of the non-fluid body and the first and second sides of the transparent optical element are connected via one or more interconnected optically transparent components, and wherein the refractive index throughout the connection is greater than the refractive index of air, and
providing an actuator system comprising one or more actuators and an actuator-component configured to undergo bending and/or displacement by the one or more actuators, wherein a side of the actuator-component abuts the second surface of the non-fluid body,
wherein
the one or more interconnected optically transparent components comprises the non-fluid body and the transparent optical element, wherein the non-fluid body has the same or substantially the same refractive index as the transparent optical element and/or the actuator component, and wherein
the third side of the transparent optical element comprises the optical reflection surface, alternatively,
the actuator-component comprises the optical reflection surface arranged as a reflection surface on the surface of the actuator-component facing the optical transparent element or arranged as a reflection surface on the opposite surface of the actuator-component where the first surface of the non-fluid body abuts the third side of the transparent optical element, whereby
the optical reflection surface is configured to deflect the light ray transmitted through the first side towards the second side.

22. An electronic device comprising a camera module according to claim 17, wherein the device is any one of:
 a. A telephone, such as a smartphone,
 b. A watch, such as a smartwatch,
 c. A tablet, such as an iPad®,
 d. A laptop, or
 e. A camera.

23. A method of obtaining an image comprising capturing an image using an electronic device comprising a camera module according to claim 22.

* * * * *